United States Patent Office 3,574,741
Patented Apr. 13, 1971

3,574,741
SULFONAMIDOPHENALKYLAMINES
William A. Gould, deceased, late of Toronto, Ontario, Canada, by Barbara E. Gould, legal representative, and Aubrey A. Larsen, Evansville, Ind., assignors to Mead Johnson & Company, Evansville, Ind.
No Drawing. Continuation-in-part of application Ser. No. 507,664, Nov. 15, 1965. This application Apr. 14, 1969, Ser. No. 817,272
Int. Cl. C07c 143/74, 143/78
U.S. Cl. 260—556
14 Claims

ABSTRACT OF THE DISCLOSURE

Phenalkylamine compounds having both the hydroxyl and sulfonamido groups in the phenyl ring constitute a new class of highly active sympathomimetic agents.

---

The present application is a continuation-in-part of copending application Ser. No. 507,664, filed Nov. 15, 1965, and now abandoned.

This invention provides a novel group of phenalkylamine compounds containing the combination of phenolic hydroxyl and sulfonanilide substituents, therapeutic compositions, and methods employing them, and intermediates instrumental in their manufacture. The phenalkylamine compounds have the structures shown in Formula I.

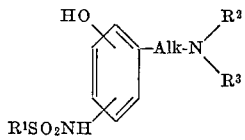

FORMULA I

In this formula the OH and $R^1SO_2NH$ groups occupy any of the 2, 3, 4, 5, or 6-positions of the phenyl ring. The symbol Alk is an alkylene group of two to five carbon atoms joining the phenyl ring and the aminonitrogen substituent

through two or three carbon atoms. It may be straight or branched. Examples of Alk groups are drawn below:

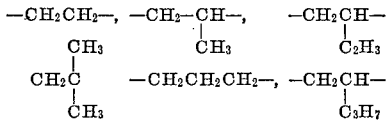

$R^1$ is lower alkyl, alkenyl, cycloalkyl, or cycloalkenyl of up to 6 carbon atoms, phenyl, naphthyl, substituted phenyl, or substituted naphthyl. The substituents may be lower alkyl, alkenyl, cycloalkyl, cycloalkenyl, or lower alkoxy of up to 6 carbon atoms, or halogen, including chlorine, bromine, iodine, or fluorine.

The amino group

may be an N-substituted heterocyclic group having up to seven carbon atoms or an N-substituted heteropolycyclic group having up to 11 carbon atoms in which the nitrogen atom is part of the heterocyclic ring when $R_2$ and $R_3$ are joined, either directly or through a nitrogen, sulfur, or oxygen atom. The Alk group is attached to the heterocyclic nitrogen atom.

Examples of heterocyclic and heteropolycyclic groups are piperidine, morpholine, piperazine, indoline, 3-aza-bicyclo(2,2,2)nonane, pyrrolidine, hexamethyleneimine, thiamorpholine, perhydroisoquinoline, tetrahydroisoquinoline, perhydroquinoline, tetrahydroquinoline, 1 - (3 - indoyl)isopropylamine, etc.

The group

may also represent a simple primary secondary, or tertiary amino group. In such products $R^2$ is hydrogen, alkyl, of no more than 4 carbon atoms, or benzyl. $R^3$ is hydrogen, alkyl, alkenyl, cycloalkyl, cycloalkenyl, cycloalkylalkyl, cycloalkenylalkyl, polycycloalkyl, polycycloalkenyl, polycycloalkylalkyl, polycycloalkenylalkyl, aryl, aralkyl, aralkenyl, aryloxyalkyl, heterocyclic, heterocycloalkyl, heteropolycyclic, or heteropolycycloalkyl, each containing up to 10 carbon atoms and up to two substituents selected from hydroxyl, carboxyl, amino, halogen, methylenedioxy, $R^1SO_2NH$, lower alkyl, or lower alkoxy of 1 to 4 carbon atoms.

The novel phenalkylamino compounds of the present invention are sympathomimetic amines of high potency. This discovery is surprising since it is known that neither hydroxyl substitution nor sulfamyl substitution in the phenyl ring of β-phenethylamine compounds results in a useful enhancement of activity. For instance, β-phenethylamine, β-phenylisopropylamine, and the 4-hydroxy and 3,4-dihydroxy analogs thereof have only 1 to 2% the pressor activity of epinephrine, (G. A. Alles, J. Pharmacol. 47, 339 (1933)). 4'-(2-aminopropyl)methanesulfonanilide has been reported to be inactive (F. G. Holland, et al., J. Med. Chem. 6, 521 (1963)).

Those compounds of Formula I wherein $R^2$ and $R^3$ are hydrogen or lower alkyl groups of no more than 2 carbon atoms are pressor amines. For example, 5'-(2-aminoethyl)-2'-hydroxymethanesulfonanilide and 5'-(2-aminopropyl) - 2' - hydroxymethanesulfonanilide are approximately equipotent as phenylephrine as pressor agents. One aspect of the present invention involves the discovery that 5'-[2-(cyclopropylamino)ethyl] - 2' - hydroxymethanesulfonanilide is a potent pressor amine similar in many respects to the aforesaid 2-aminoethyl- and 2-aminopropyl-2'-hydroxymethanesulfonanilides. Compounds of Formula I wherein $NR^2R^3$ moieties have about 7 to 10 carbon atoms, such as a plurality of araliphatic groups, including phenethyl, phenoxyisopropyl, p-methoxyphenethyl, are generally depressor agents and frequently have a sympathomimetic action on smooth muscle.

The compounds of the present invention are characterized by remarkably low toxicities in relation to their activity, i.e., they have favorable therapeutic ratios. The pressor substances offer the advantage of improved absorption on oral administration or through the mucous membranes on topical administration. The latter is of particular importance for nasal decongestant or vasoconstrictor use for treatment of certain conditions of the eye.

Dosage by the oral, parenteral, or rectal routes in the range 0.1 mcg. to 20 mg./kg. of body weight of host are to be employed. Many of the substances have acute $LD_{50}$ values in excess of 2000 mg./kg. For topical use in the nose or eye, isotonic aqueous solutions having concentrations of about 0.1 to 10% by weight and containing preservatives and stabilizers as required are operable. Solutions of that concentration when sterile may be used for injection. Oil solutions or suspensions may also be employed. For oral use, tablets or capsules or liquid formulations such as solutions, suspensions in the form of syrups, or elixirs may be formulated containing from 5 to 50 mg. of one of the present substances per dosage unit.

Pharmaceutical formulations of the present invention may be compounded with one of the novel sulfonanilides disclosed and claimed herein as the sole active ingredient or they may include other additional ingredients, including tranquilizers, sedatives, analeptics, analgesics, antipyretics, hypnotics, antibiotics such as polymixin, tyrothrycin, grammacidin, tyrocidin, and neomycin, antihistamines such as chlorophenpyridamine maleate, or methdilazine hydrochloride, anti-inflammatory agents such as cortisone phosphate, a surfactant, a chemical antiseptic such as thimerasol, benzalkonium chloride, or a mucolytic agent such as tyloxypal.

A preferred compound of the present invention due to its strong and selective adrenergic vasoconstrictor activity and its low toxicity is 5'-(2-aminoethyl)-2'-hydroxymethanesulfonanilide hydrochloride. For topical use for installation into the nose or eyes, solutions formulated according to accepted pharmaceutical standards having concentrations of that compound of 0.05 to 10% by weight are useful. For oral use dosage units containing 5 to 50 mg. thereof may be employed.

Formulation 1.—Nose drops: A solution having a concentration of 0.5% of 5'-(2-aminoethyl)-2'-hydroxymethanesulfonanilide hydrochloride is prepared by dissolving the following ingredients in sufficient distilled water to provide 1.1 of solution.

| | | |
|---|---|---|
| 5'-(2-aminoethyl)-2'-hydroxymethanesulfonanilide hydrochloride | g | 5.0 |
| Sorbitol solution, N.F. | ml | 50.0 |
| Methylparabens | g | 0.4 |
| Propylparabens | g | 0.2 |
| Sodium citrate, U.S.P. | g | 4.4 |
| Sodium bisulfite, A.R. | g | 1.0 |

Formulation 2.—Tablets: A scored tablet containing 10 mg. of 5'-2-aminoethyl)-2'-hydroxymethanesulfonanilide hydrochloride is prepared as follows: A dry blend of 57.0 g. of lactose, U.S.P. and 57.0 g. of mannitol powder is prepared and granulated with a 10% w./w. starch paste containing 9.7 g. of corn starch, U.S.P. The moist granulation is screened through a No. 12 screen and dried at 130° F. until the moisture is less than 2%. The dry granules are then reduced in size by shaking through a No. 20 screen. The following materials are then blended with this screened granulation:

| | G. |
|---|---|
| 5'-(2-aminoethyl)-2'-hydroxymethanesulfonanilide hydrochloride | 10.0 |
| Magnesium stearate | 1.3 |

The total weight of this preparation is 135 g. It is compressed into tablets each containing 10 mg. of 5'-(2-aminoethyl)-2'-hydroxymethanesulfonanilide hydrochloride on conventional tableting equipment.

Formulation 3.—Ophthalmic solution: A buffered sterile ophthalmic solution containing 1.0% of 5'(2-aminoethyl)-2'-hydroxymethanesulfonanilide hydrochloride is prepared from the following ingredients:

| | | |
|---|---|---|
| 5'-(2-aminoethyl)-2'-hydroxymethanesulfonanilide hydrochloride | g | 5.0 |
| Sodium biphosphate | g | 3.2 |
| Sodium phosphate, dibasic | g | 0.95 |
| Methyl cellulose, 4000 M.C. | g | 3.0 |
| Phenylmercuric acetate | g | 0.02 |
| Distilled water, Q.S. | ml | 1000 |

The resulting solution has a pH of 6.0 to 6.5. It is sterilized by filtration through a bacterial filter prior to filling into sterile ampules.

The phenalkylamine products of the present invention may be prepared by hydrogenolysis of the aliphatic hydroxyl group of the phenalkanolamine compounds of Formula II.

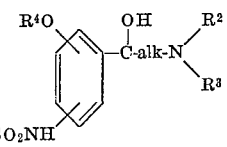

Formula II

In Formula II, $R^1$, $R^2$, and $R^3$ have the same meaning as in Formula I. $R^4$ is hydrogen, benzyl, or other readily cleaved group such as benzhydryl, triphenylmethyl, t-butyl, or tetrahydropyranyl. The side chain structure

to which the aliphatic nitrogen atom is attached corresponds in structure to Alk in Formula I. In other words,

is simply the Alk group of Formula I hydroxylated on the carbon atom attached to the benzene ring.

The intermediates of Formula II are described in U.S. Pat. 3,341,584. The disclosure of this patent is incorporated herein by reference to the extent that methods of preparation and working examples for the substances of Formula II are disclosed.

Reaction conditions for hydrogenolysis of the aliphatic hydroxyl of the substances of Formula II are known to those skilled in the art. Catalytic hydrogenation conditions are generally preferred. We have found that hydrogen pressures of from about 1 to 6 atmospheres are adequate when 5% palladium-on-barium sulfate is the catalyst and an acidic reaction medium is employed. The preferred acidic medium is glacial acetic acid containing a small amount of perchloric acid or other strong acid such as the mineral acids and Lewis acids including HCl, $H_2SO_4$, p-$CH_3C_6H_4SO_2H$, $BF_3$, $AlCl_3$, etc. The hydrogenolysis method of preparing substances of Formula I from substances of Formula II is illustrated by Procedure 13. This method is applicable to the preparation of all variations of the structure Formula I including those in which Alk contains either two or three carbon atoms separating the benzene ring and the aminonitrogen atom. In those instances when $R^4$ of Formula II is benzyl, benzhydryl, or triphenylmethyl, it is removed in the course of the hydrogenation to provide the desired nuclear hydroxyl group of Formula I. The $R^4$ t-butyl and tetrahydropyranyl groups when employed are subsequently removed by aqueous acid hydrolysis.

Another method for the preparation of compounds of Formula I from Formula II intermediates is the replacement of the β-hydroxyl group of Formula II with a halogen and subsequently dehalogenating the β-halophenethylamine catalytically or with sodium borohydride.

Those phenalkylamine products of Formula I in which Alk contains two carbon atoms in a chain separating $NR^2R^3$ from the phenyl ring, that is compounds of the phenethylamine type, may also be prepared from the $R^4O$—, $R^1SO_2NH$-substituted nitrostyrene derivatives of Formula III, which appears in the reaction scheme of Equations 1–4 below.

EQUATIONS 1–4

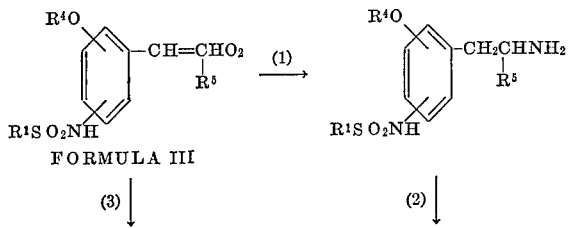

FORMULA III

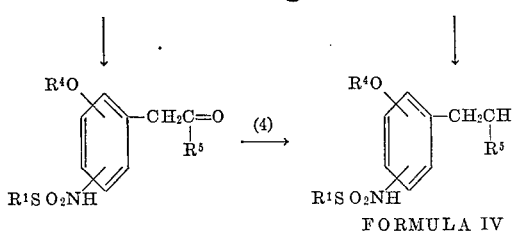

FORMULA IV

In Formula III $R^1$ and $R^4$ have the same meaning as in Formula II, and $R^5$ refers to a hydrogen atom or a lower alkyl group of no more than 3 carbon atoms including methyl, ethyl, propyl, and isopropyl. Reduction of the nitrostyrene of Formula III by methods known in the art such as catalytic hydrogenation or metal hydride reduction yields the corresponding phenethylamine compound in which $R^1$, $R^4$, and $R^5$ have the same meaning as before. This transformation is shown in Equation 1.

The product of Equation 1 will be recognized as one of the substances of Formula I in which $R^4O$ represents the phenolic hydroxyl group or equivalent as defined above for $R^4$, and in which $R^2$ and $R^3$ of Formula I are hydrogen atoms. These materials can be transformed into the corresponding intermediates of Formula IV in which $R^2$ and $R^3$ are substituent groups as defined for Formula I by alkylation of the side chain amino group with an alkylating agent having known capability of introducing substituents as defined for $R^2$ and $R^3$ into primary amines such as an alkyl halide, sulfate, or phosphate, or reductive amination with an aldehyde or ketone. This transformation is represented by Equation 2.

An alternative method for transformation of the nitrostyrenes of Formula III into the intermediates of Formula IV involves the reductive hydrolysis according to Equation 3 to the corresponding phenylacetaldehyde or benzyl alkyl ketone. One convenient method for accomplishing this involves reaction of the nitrostyrene with iron and hydrochloric acid. Other methods will be apparent by analogy to similar transformations known to the art.

The intermediate phenylacetaldehydes and benzyl alkyl ketones produced by Equation 3 are convertible by reductive amination into the phenethylamine compounds of Formula IV employing ammonia or a primary or secondary amine of the formula $R^2R^3NH$. This transformation is represented by Equation 4. The process is carried out according to established techniques employing hydrogen and a catalyst as reducing medium or various chemical reducing agents such as zinc and acetic acid, sodium amalgum and ethanol, sodium and ethanol, or other reducing agents (Adams, "Organic Reactions," vol. 4, 1949, pages 174–255). Preferred reaction conditions involve hydrogenation of a mixture of the carbonyl compound from Equation 3 and the desired amine or ammonia in a solvent such as acetic acid or ethanol over a platinum catalyst.

The nitrostyrene intermediates of Formula III are prepared by condensation of the correspondingly substituted benzaldehydes, Formula V, with a nitroparaffin such as nitromethane, nitroethane, 1-nitropropane, 2-nitropropane, nitrobutane, etc., according to Equation 9. This condensation may be conducted, for instance, employing ammonium acetate as catalyst and an excess of the nitroparaffin as reaction medium.

The benzaldehyde compounds of Formula V, more properly referred to as formyl-$R^4O$-sulfonanilides, are key intermediates for this purpose, and are considered part of the present invention. They are obtained from the corresponding $R^4O$-nitrobenzaldehydes as is illustrated in Equations 5–8 by conversion thereof to the acetal, reduction of the nitro group to the amino group, and acylation of the amino group with the appropriate sulfonyl halide or anhydride. $R^4$ has the same meaning in Formula V as previously.

It is preferred that $R^4$ be other than hydrogen for the processes of Equations 5–9, but this is not essential. The acylation and hydrolysis procedures of Equations 7 and 8 may frequently be combined into a single step. For the preparation of the aldehydes of Formula V in which $R^4$ is hydrogen, cleavage of $R^4$ by hydrogenolytic methods should precede hydrolysis of the acetal. Where hydrolytic methods are involved, these operations may be combined.

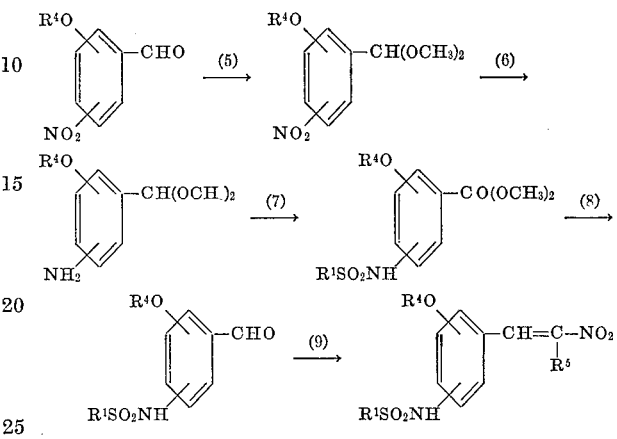

EQUATIONS 5–9

As a last step in the preparation of the products of Formula I according to the scheme outlined in Equations 1–4, it is sometimes necessary to include an additional reaction step to transform the $R^4O$ substituent into the phenolic hydroxyl shown in Formula I. In other instances this transformation occurs concomitantly with the transformations indicated in Equations 1 or 2 or in Equations 3 or 4. In any event, adaption of the method to provide for this transformation is within the skill of the art. For example, where an affirmative step is necessary, hydrogenolysis over palladium catalyst or cleavage with sodium and liquid ammonia can be employed when $R^4$ is benzyl, benzhydryl, or triphenylmethyl. Hydrolysis with dilute aqueous acid is used when $R^4$ is t-butyl or tetrahydropyranyl.

Those phenalkylamine products of Formula I in which Alk contains three carbon atoms in a chain separating $NR^2R^3$ from the phenyl ring may also be prepared from the corresponding β-phenylpropionic acids by conversion to the amide and reduction of amide to amine. These transformations are shown in Equations 10 and 11.

EQUATIONS 10 AND 11

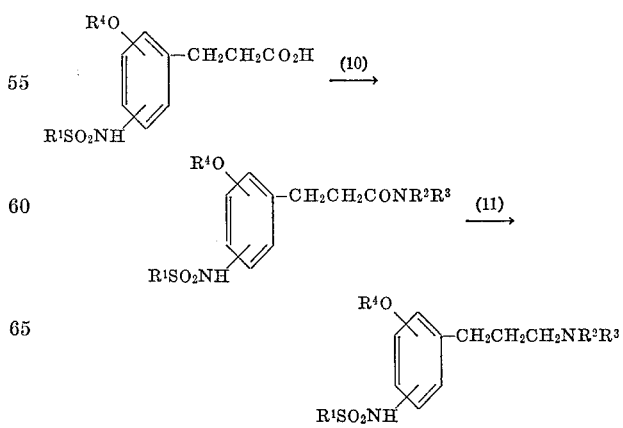

The phenylpropionic acid starting material may, of course, bear additional alkyl substituents on the carbon atom alpha to the carboxylic function such as methyl or ethyl groups to provide a final product having a side chain corresponding to Alk in Formula I. The phenylpropionic acid starting materials are prepared from the aldehydes of Formula V by conventional means such as the malonic acid or malonic ester synthesis. Conversion of the acids to the amides in Equation 10 also employs known methods. Reduction thereof to the amines in Equation 11 is most readily accomplished by metal hydride reduction.

PROCEDURE 1

4-hydroxy-3-nitrobenzaldehyde 4-hydroxybenzaldehyde, 122.0 g. (1.0 mole), is added portionwise during a 30 min. period to 500 ml. of red fuming nitric acid with stirring and cooling at −25 to −30° C. Stirring is continued at −25° C. for 1 hr., and the reaction mixture is then poured into 2 l. of crushed ice. The precipitate is collected, washed with water and air dried: yield, 162 g. (97%), M.P. 138–140° C. This material may be triturated with 500 ml. of ether and filtered to effect purification; yield, 153 g., M.P. 142–145° C.

PROCEDURE 2.

4-benzyloxy-3-nitrobenzaldehyde

A mixture of 109 g. (0.54 mole) of 4-hydroxy-3-nitrobenzaldehyde, 83 g. (0.65 mole) of benzyl chloride, 72 ml. (0.72 mole) of 10 N potassium hydroxide, 5.0 g. (0.03 mole) of sodium iodide in 950 ml. of 95% ethanol, and 250 ml. of water is stirred and refluxed for 48 hr. The reaction mixture is cooled and poured into 5 l. of ice water. The yellow solid which precipitates is collected and washed with water. The moist solid is triturated with dilute aqueous sodium hydroxide, filtered, washed repeatedly with water, and dried in a vacuum oven at 45° C.; yield, 79.5 g. (47.5%), M.P. 89–96° C. Recrystallization from ethanol yields 63.0 g. of purified material, M.P. 96–100° C., a small sample of which was recrystallized from ethanol for analysis, M.P. 97–100° C.

*Analysis.*—Calcd. for $C_{14}H_{11}NO_4$ (percent): C, 65.36; H, 4.31; N, 5.45. Found (percent): C, 65.09; H, 4.52; N, 5.69.

PROCEDURE 3

4-benzyloxy-3-nitrobenzaldehyde dimethyl acetal

Concentrated hydrochloric acid, 0.27 ml., is added dropwise to a stirred suspension of 128.5 g. (0.5 mole) of 4-benzyloxy-3-nitrobenzaldehyde in 190 ml. of absolute methanol. After stirring for 1 hr. at room temperature, 20 g. of crystaline alumino silicate drying agent (molecular sieve Type 4A, Linde Company) is added and stirring is continued for 1.5 hr. The mixture is filtered and the filtrate made slightly alkaline with methanolic sodium methylate. The solution is concentrated at reduced pressure, the residual oil dissolved in 500 ml. of ether, and the ether solution washed with water and dried successively over anhydrous magnesium sulfate and anhydrous sodium carbonate. The ether is evaporated at reduced pressure, leaving a viscous orange oil weighing 143.0 g. (94.5%). This material was reduced without further purification.

PROCEDURE 4

3-amino-4-benzyloxybenzaldehyde dimethyl acetal

A solution of 4-benzyloxy-3-nitrobenzaldehyde dimethyl acetal, 75.7 g. (0.25 mole) in 750 ml. of ethanol is heated to reflux temperature with stirring. The heating bath is removed and five teaspoonfuls of moist Raney nickel catalyst is added. A solution of 99% hydrazine hydrate, 37.5 g. (0.72 mole), in 35 ml. of ethanol is then added dropwise over a 30 min. period while stirring. After an additional hour of reflux, the mixture is filtered. The filtrate is concentrated by distillation at reduced pressure, and the residue is extracted with 500 ml. of ether. The extract is dried over anhydrous magnesium sulfate and concentrated under reduced pressure yielding an orange oil which crystallizes on standing; 64.8 g. (95%). Recrystallization of this material from isopropyl ether yields the purified product, M.P. 62–65° C.

*Analysis.*—Calcd. for $C_{16}H_{19}NO_3$ (percent): C, 70.30; H, 7.01; N, 5.12. Found (percent): C, 70.18; H, 7.10; N, 5.29.

PROCEDURE 5

2′-benzyloxy-5′-formylmethanesulfonanilide

A solution of methanesulfonyl chloride, 3.45 g. (0.03 mole) in 25 ml. of anhydrous benzene is added dropwise with stirring to a cooled solution of 8.2 g. (0.03 mole) of 3-amino-4-benzyloxybenzaldehyde dimethyl acetal and 6.1 g. (0.06 mole) of triethylamine in 125 ml. of anhydrous benzene. The reaction mixture is stirred at room temperature for 4.5 hr., the precipitated triethylamine hydrochloride removed by filtration, and the filtrate extracted with three 50 ml. portions of 1 N aqueous potassium hydroxide solution. The aqueous extracts are acidified to precipitate the product. The product is collected on a filter and washed with water; 5.0 g., M.P. 140–158° C. Recrystallization from isopropyl alcohol yields the purified material weighing 2.5 g., M.P. 145–153° C.

*Analysis.*—Calcd. for $C_{15}H_{15}NO_4S$ (percent): C, 59.00; H, 4.95; N, 4.59; S, 10.50. Found (percent): C, 59.28; H, 5.25; N, 4.88; S, 10.61.

Methanesulfonic anhydride may be substituted as acylating agent in Procedure 5.

PROCEDURE 6

2′-benzyloxy-5′-(2-nitrovinyl)methanesulfonanilide

A mixture of 30.5 g. (0.1 mole) of 2′-benzyloxy-5′-formylmethanesulfonanilide, 2.0 g. of ammonium acetate, and 350 ml. of nitromethane is heated at 95–97° C. for 5.5 hr. with stirring. The warm reaction mixture is filtered, and the filtrate diluted with isopropyl ether. The product precipitates and is collected on a filter and washed with isopropyl ether; 9.0 g., M.P. 165–170° C. Concentration of the filtrate yields an additional portion weighing 7.8 g., M.P. 164–170° C. Recrystallization of the combined crops from ethyl acetate provides the purified product, M.P. 170–174° C.

*Analysis.*—Calcd. for $C_{16}H_{16}N_2O_5S$ (percent): C, 55.16; H, 4.63; N, 8.04; S, 9.20. Found (percent): C, 55.21; H, 4.69; N, 8.32; S, 9.35.

PROCEDURE 7

2′-benzyloxy-5′-(2-nitro-1-propenyl)-methanesulfonanilide

The method of Procedure 6 is applied to nitroethane as is described in that procedure for nitromethane. The product is obtained in the same fashion in 55% yield. It is recrystallized from ethyl acetate; M.P. 160–163° C.

*Analysis.*—Calcd. for $C_{17}H_{18}N_2O_5S$ (percent): C, 56.34; H, 5.00; N, 7.73; S, 8.85. Found (percent): C, 56.44; H, 5.23; N, 7.54; S, 8.95.

PROCEDURE 8

5′-(2-aminoethyl)-2′-benzyloxymethanesulfonanilide hydrochloride

A solution of 7.2 g. (0.02 mole) of 2′-benzyloxy-5′-(2-nitrovinyl)methanesulfonanilide in 75 ml. of dry tetrahydrofuran is added dropwise with stirring to a cooled suspension of 3.15 g. (0.08 mole) of lithium aluminum hydride in 100 ml. of dry tetrahydrofuran. After stirring for 1 hr. at room temperature, the mixture is filtered, the filter-cake extracted with three 250 ml. portions of boiling ethanol. The combined extracts are acidified with ethanolic hydrogen chloride and concentrated. The residue is triturated with a methanol-isopropyl ether mixture and collected; yield, 4.0 g. (54%), M.P. 201–215° C. (dec.). This material is twice recrystallized from methanol-isopropyl ether to yield the purified product; M.P. 218–221° C.

Analysis.—Calcd. for $C_{16}H_{20}N_2O_3S \cdot HCl$ (percent): C, 53.84; H, 5.93. Found (percent): C, 54.12; H, 6.14.

PROCEDURE 9

5'-(2-aminoethyl)-2'-hydroxymethanesulfonanilide hydrochloride

A mixture of 4.0 g. (0.01 mole) of 5'-(2-aminoethyl)-2'-benzyloxymethanesulfonanilide hydrochloride and 1.0 g. of 10% palladium-on-carbon catalyst in 250 ml. of 90% ethanol is hydrogenated at 40 p.s.i. until 0.01 mole of hydrogen has been absorbed. The reaction mixture is filtered and the filtrate concentrated to dryness. The solid residue is triturated with a small volume of isopropyl alcohol and filtered; yield, 2.7 g. (90%), M.P. 219–222° C. (dec.). Recrystallization of this material from methanol-isopropyl ether yields purified products weighing 2.1 g., M.P. 221.5–222.5° C. (dec.).

Analysis.—Calcd. for $C_9H_{15}N_2O_3S \cdot HCl$ (percent): C, 40.52; H, 5.67; N, 10.50; S, 12.02. Found (percent): C, 40.82; H, 5.78; N, 10.27; S, 12.00.

By application of Procedures 2, 3, 4, 5, 6, 8, and 9 used in preparing 5'-(2-aminoethyl)-2'-hydroxymethanesulfonanilide to other nitro hydroxy substituted benzaldehyde starting materials, a series of analagous products is produced having the hydroxyl and methanesulfonamido substituents oriented in various other positions of the benzene ring. This is illustrated in Table I.

TABLE I.—VARIOUS ORIENTATIONS

| Starting material | Product |
| --- | --- |
| 3-Nitrosalicaldehyde | 3'-(2-aminoethyl)-2'-hydroxymethanesulfonanilide. |
| 5-nitrosalicaldehyde | 3'-(2-aminoethyl)-4'-hydroxymethanesulfonanilide. |
| 3-hydroxy-2-nitrobenzaldehyde | 2'-(2-aminoethyl)-6'-hydroxymethanesulfonanilide. |
| 3-hydroxy-4-nitrobenzaldehyde | 4'-(2-aminoethyl)-2'-hydroxymethanesulfonanilide. |
| 6-nitro-3-hydroxybenzaldehyde | 2'-(2-aminoethyl)-4'-hydroxymethanesulfonanilide. |
| 4-hydroxy-2-nitrobenzaldehyde | 2'-(2-aminoethyl)-5'-hydroxymethanesulfonanilide. |

PROCEDURE 10

2'-benzyloxy-5'-[2-(isopropylamino)ethyl]methanesulfonanilide hydrochloride

A mixture of 3.5 g. (0.01 mole) of 5'-(2-aminoethyl)-2'-benzyloxymethanesulfonanilide (Procedure 8), 2.40 ml. (0.03 mole) of acetone, 0.63 ml. (0.01 mole) of acetic acid, and 0.25 g. of platinum oxide in 100 ml. of absolute ethanol is hydrogenated at 40 p.s.i. until 0.01 mole of hydrogen has been absorbed. The reaction mixture is filtered. The filtrate is acidified with ethanolic hydrogen chloride and evaporated to dryness at reduced pressure. The solid residue triturated with isopropyl alcohol-isopropyl ether, and then from ethanol-ether yields the pure product, M.P. 186–193° C.

Analysis.—Calcd. for $C_{19}H_{26}N_2O_3S \cdot HCl$ (percent): C, 57.20; H, 6.82, S, 8.04. Found (percent): C, 57.28, H, 6.88, S, 8.13.

PROCEDURE 11

5'-acetonyl-2'-benzyloxymethanesulfonanilide

To a stirred, refluxing mixture of 109.3 g. (0.302 mole) of 2'-benzyloxy-5'-(2-nitro-1 - propenyl)methanesulfonanilide (Procedure 7), 140 g. of powdered iron and 3.0 g. of ferric chloride in 520 ml. of water there is added in dropwise fashion 52.0 ml. of concentrated hydrochloric acid. The reaction mixture is refluxed for 2 hr. following this treatment, and then filtered. The filter-cake is washed with water and twice triturated with 600 ml. of boiling methanol, yield, 55.3 g., M.P. 100–104° C. The filtrates are concentrated at reduced pressure to yield an additional portion of product weighing 18.3 g., M.P. 94–104° C. The product is twice recrystallized from methanol, M.P. 102–106° C.

Analysis.—Calcd. for $C_{17}H_{19}NO_4S$ (percent): C, 61.24; H, 5.74; N, 4.20; S, 9.62. Found (percent): C, 61.13; H, 5.99; N, 4.10; S, 9.76.

PROCEDURE 12

2'-benzyloxy-5'-[2-(phenethylamino)propyl]methanesulfonanilide hydrochloride

A mixture of 6.1 g. (0.018 mole) of 5'-acetonyl-2'-benzyloxymethanesulfonanilide, 4.4 g. (0.036 mole) of β-phenethylamine, 1.1 g. (0.018 mole) of glacial acetic acid, and 0.17 g. of platinum oxide in 150 ml. of absolute ethanol is hydrogenated at 40 p.s.i. until 0.018 mole of hydrogen has been absorbed. The reaction mixture is filtered and the filtrate acidified with ethanolic hydrogen chloride and concentrated at reduced pressure to give an oily solid. This material is triturated with isopropyl alcohol and filtered, yielding 5.3 g. of product, M.P. 140–144° C. An additional 0.3 g. was obtained on evaporation of the filtrate. Recrystallization from 2-butanone yields purified material M.P. 140–144.5° C.

Analysis.—Calcd. for $C_{25}H_{30}N_2O_3S \cdot HCl$ (percent): C, 63.20; H, 6.58; S, 6.75. Found (percent): C, 63.24; H, 6.62; S, 6.84.

PROCEDURE 13

2'-hydroxy-5'-[2-(isopropylamino)ethyl]methanesulfonanilide hydrochloride

A mixture of 5.0 g. (0.0154 mole) of 2'-hydroxy-5'-(1-hydroxy-2 - isopropylaminoethyl)methanesulfonanilide hydrochloride, 3.0 g., 5% palladium-on-barium sulfate, 3.0 ml. perchloric acid (70%), and 60 ml. glacial acetic acid is hydrogenated in a Parr shaker at 60 p.s.i. The reaction mixture is heated at 90° C. during the process. When the calculated amount of hydrogen has been absorbed, the mixture is cooled to room temperature and the catalyst and product are recovered by filtration. The filter-cake is triturated with 200 ml. hot ethyl alcohol, filtered while hot and concentrated under reduced pressure, resulting in recovery of 0.2 g. of starting material. The cake is then thoroughly triturated with hot ethyl alcohol (about 600 ml.), filtered while hot, and the filtrate concentrated under reduced pressure. Trituration of the residue with hot isopropyl alcohol yields 1.7 g. (31%) of the desired product, M.P. 258–259° C., identical in all respects including mixed melting point with the product produced by Procedure 14.

PROCEDURE 14

5'-[1-chloro-2-(1-phenoxy-2-propylamino)propyl]-2'-hydroxymethanesulfonanilide hydrochloride Thionyl chloride (1.81 ml., 0.025 mole) is added in one portion to 2'-hydroxy-5'-[1-hydroxy-2-(1-phenoxy-2-propylamino)propyl]methansulfonanilide hydrochloride (4.3 g., 0.01 mole) suspended in 20 ml. acetonitrile and 4 drops of dimethylformamide. The mixture is refluxed until solution is effected (ca. 10 min.). Isopropyl ether (50 ml.) is then added to the red-black solution forcing out an oil which is separated by decantation. Additional isopropyl ether (50 ml.) is added to the residual oil and the mixture stirred until tacky. The residue, which is separated by decantation, taken up in 15 ml. of acetonitrile and warmed on a steam bath slowly deposits a tan solid, 2.9 g. (64.5%), M.P. 160–162.5° C. (dec.).

The analytically pure product is obtained by crystallizing this material from dimethylformamide acetonitrile; yield, 1.85 g. (41.3%), M.P. 164.5–165.5° C. (dec.) (corr.).

Calcd. for $C_{19}H_{26}Cl_2N_2O_4S$ (percent): C, 50.78; H, 5.83; Cl, 15.78; N, 6.24. Found (percent): C, 51.06; H, 5.84; Cl, 15.63; N, 6.36.

PROCEDURE 15

2′-hydroxy-5′-[2-(4-methoxyphenethylamino)propyl]methanesulfonanilide hydrochloride Treatment of 2′-hydroxy-5′-[1-hydroxy-2-(4-methoxyphenethylamino)propyl]methanesulfonanilide hydrochloride (8.6 g., 0.02 mole) with thionyl chloride (2.6 g., 0.022 mole) according to the method of Procedure 14 provides 2′-hydroxy-5′-[1-chloro-2-(4-methoxyphenethylamino)propyl]methanesulfonanilide hydrochloride.

The chloro compound is added portionwise in 15 min. to a suspension of sodium borohydride (3.78 g., 0.1 mole) in absolute ethanol (100 ml.) at 10–15° C. After completing the addition, the mixture is stirred at room temperature for 0.5 hr., acidified with ethanolic hydrogen chloride and warmed to reflux for 5 min. and filtered. Dilution of the filtrate with 100 ml of ether provies 6.1 g. (75% overall yield) of white solid, M.P. 180–183.5° C. (corr.).

Analysis.—Calcd. for $C_{19}H_{27}ClN_2O_4S$ (percent): C, 54.99; H, 6.56; N, 6.75; S, 7.73. Found (percent): C, 55.25; H, 6.25; N, 6.75; S, 7.86.

PROCEDURE 16

2′-hydroxy-5′-[2-(1-phenoxy-2-propylamino)propyl]methanesulfonanilide hydrochloride A suspension of 5′-[1-chloro-2-(1-phenoxy-2-propylamino)propyl]-2′-hydroxy-methanesulfonanilide hydrochloride (745 g., 0.017 mole) in 250 ml. of absolute ethanol is reduced in an atmosphere of hydrogen employing 3.5 g. of 10% palladium-on-carbon catalyst. When the hydrogen uptake ceases, the mixture is filtered. The filter-cake is extracted with 100 ml. of warm methanol. The methanol extract and ethanol filtrate are combined and the alcoholic solvents removed under reduced pressure. The residue warmed with acetonitrile provides the phenethylamine product, M.P. 203–212° C. (5.8 g., 85%). Crystallization of this material from ethanol-isopropyl ether affords analytically pure phenethylamine product, M.P. 220–221° C. (corr.).

Analysis.—Calcd. for $C_{19}H_{27}ClN_2O_4S$ (percent): C, 54.99; H, 6.56; N, 6.75. Found (percent): C, 54.89; H, 6.50; N, 6.72.

Some representative substituted phenethylamines of the present invention prepared by the application of Procedures 1–16 are given in Table II along with precursors, procedure numbers, crystallization solvents, melting points and elemental analytical values Procedures 13 to 16 are applicable to the preparation of a large number of additional compounds of the present invention. Products given in Table III exemplify substituted phenethylamines prepared from substances of Formula II. The following list is illustrative of the phenethylamine products obtained by employing the phenethanolamines described in Table XI of U.S. 3,341,584, as starting materials.

TABLE II.—SUBSTITUTED PHENETHYLAMINES

| Example Number | Product | Starting material | Procedure | Recrystallization solvent | M.P. degree, °C. | Calculated C | Calculated H | Calculated N | Calculated S | Found C | Found H | Found N | Found S |
|---|---|---|---|---|---|---|---|---|---|---|---|---|---|
| 1 | 5′-(2-aminopropyl)-2′-benzyloxymethanesulfonanilide hydrochloride | 2′-benzyloxy-5′-(2-nitro-1-propenyl)methanesulfonanilide hydrochloride | 8 | 2-propanol | 137.5–140.5 | 55.05 | 6.25 | 7.55 | 8.64 | 54.75 | 6.45 | 7.44 | 8.71 |
| 2 | 5′-(2-aminopropyl)-2′-hydroxymethanesulfonanilide hydrochloride | 5′-(2-aminopropyl)-2′-benzyloxymethanesulfonanilide hydrochloride | 9 | Methanolisopropyl ether | 217–219 | 42.77 | 6.10 | 9.98 | 11.42 | 1.55 | 5.98 | 9.77 | 11.38 |
| 3 | 2′-hydroxy-5′-[2-(isopropylamino)ethyl]methanesulfonanilide hydrochloride | 2′-benzyloxy-5′-[2-(isopropylamino)ethyl]methanesulfonanilide hydrochloride | 9 | ----do---- | 254.5–258.5 | 46.67 | 6.85 | | 10.38 | 46.66 | 6.71 | | 10.46 |
| 4 | 2′-benzyloxy-5′-(2-isopropylaminopropyl)methanesulfonanilide hydrochloride | 5′-(2-aminopropyl)-2′-benzyloxymethanesulfonanilide hydrochloride | 10 | 2-propanolisopropyl ether | 178–183 | 58.16 | 7.08 | | 7.76 | 58.02 | 7.30 | | 7.90 |
| 5 | 2′-hydroxy-5′-(2-isopropylaminopropyl)methanesulfonanilide hydrochloride | 2′-benzyloxy-5′-(2-isopropylaminopropyl)methanesulfonanilide hydrochloride | 9 | Methanolisopropyl ether | 190–192 | 48.36 | 7.18 | | 9.93 | 48.41 | 7.32 | | 7.98 |
| 6 | 2′-hydroxy-5′-[2-(phenethylamino)propyl]methanesulfonanilide hydrochloride | 2′-benzyloxy-5′-[2-(phenethylamino)propyl]methanesulfonanilide hydrochloride | 9 | ----do---- | 210–212 | 56.16 | 6.55 | | 8.33 | 56.35 | 6.58 | | 8.50 |
| 7 | 2′-hydroxy-5′-[2-methylaminoethyl)methanesulfonanilide hydrochloride | 2′-hydroxy-5′-[1-hydroxy-2-(methylamino)ethyl]methanesulfonanilide hydrochloride | 13 | Absolute ethanol | 163–166 | 42.77 | 6.10 | 9.98 | 11.42 | 8.88 | 6.22 | 10.06 | 11.63 |
| 8 | 2′-hydroxy-5′-[2-(1-phenoxy-2-propylamino)propyl]methanesulfonanilide hydrochloride | 5′-(2-aminoethyl)-2′-hydroxymethanesulfonanilide | 1,10 | Methanolisopropyl ether | 218.5–220.5 | 53.92 | 6.29 | 6.99 | 8.00 | 53.95 | 6.31 | 7.17 | 8.07 |
| 9 | 2′-hydroxy-4′-[2-(isopropylamino)ethyl]methanesulfonanilide hydrochloride | 2′-hydroxy-4′-[1-hydroxy-2-(isopropylamino)ethyl]methanesulfonanilide hydrochloride | 14, 15 | ----do---- | 258.5–260.5 | 46.67 | 6.85 | 9.07 | 10.38 | 46.70 | 6.98 | 9.16 | 10.52 |
| 10 | 5′-[2-(cyclopropylamino)ethyl]-2′-hydroxymethanesulfonanilide hydrochloride | 2′-hydroxy-5′-[2-(cyclopropylamino)-1-hydroxyethyl]methanesulfonanilide hydrochloride | 14, 15 | 2-propanol-methanol | 204.5–205.5 | 46.97 | 6.24 | 9.13 | | 46.73 | 6.30 | 8.89 | |

[1] Phenoxyacetone substituted for acetone.

| Example Number | Phenethylamine products |
|---|---|
| 11 | 2'-hydroxy-5'-(2-piperidinopropyl)methanesulfonanilide. |
| 12 | 2'-hydroxy-4'-(2-methylaminoethyl)methanesulfonanilide. |
| 13 | 2'-hydroxy-4'-(2-aminoethyl)methanesulfonanilide. |
| 14 | 2'-hydroxy-4'-(2-isopropylaminoethyl)-methanesulfonanilide. |
| 15 | 4'-hydroxy-3'-(2-methylaminoethyl)methanesulfonanilide. |
| 16 | 4'-hydroxy-3'-(2-aminoethyl)methanesulfonanilide. |
| 17 | 4'-hydroxy-3'-(2-isopropylaminoethyl)-methanesulfonanilide. |
| 18 | 5'-[2'-(3,4-dimethoxyphenethylamino)propyl]-2-hydroxymethanesulfonanilide. |
| 19 | 2'-hydroxy-5'-[2-(2-hydroxyethylamino)propyl]-methanesulfonanilide. |
| 20 | 2'-hydroxy-5'-[2-(4-methylphenethylamino)-propyl]methanesulfonanilide. |
| 21 | 2'-hydroxy-5'-[2-(4-methanesulfonamidophenethylamino)propyl]methanesulfonanilide. |
| 22 | 2'-hydroxy-4'-(2-phenethylaminoethyl)methanesulfonanilide. |

Various substituted phenethylamine products having substituents corresponding to Table II example numbers 2, 3, 5 and 6 and the nuclear orientations of those listed in Table I may be prepared according to aforementioned procedures by application of the methods described to the nitrohydroxybenzaldehydes listed in Table I.

Various analogs of the foregoing compounds bearing other sulfonamido groups $R^1SO_2NH-$, in place of the methanesulfonamido group can be prepared by substitution of other sulfonylhalides or anhydrides for methanesulfonyl chloride in Procedure 5. To illustrate this specifically with reference to Procedures 5, 6, 8, and 9, there is listed in Table IV a series of suitable sufonylhalides and anhydrides and the corresponding products obtainable therefrom.

TABLE III.—PHENETHYLAMINES BY ADAPTION OF PROCEDURES 13-16

| Example Number | Product | Starting material phenethanolamines |
|---|---|---|
| 23 | 3'-hydroxy-5'-[cyclopropylamino)ethyl]methanesulfonanilide. | 3'-hydroxy-5'-[2-(cyclopropylamino)-1-hydroxyethyl]methanesulfonanilide. |
| 24 | 2'-hydroxy-5'-[2-(tetrahydro-1,4-oxazino)ethyl]-methanesulfonanilide. | 2'-hydroxy-5'-[2-(tetrahydro-1,4-oxazino)-1-hydroxyethyl]methanesulfonanilide. |
| 25 | 2'-hydroxy-5'-[2-(cyclopropylmethylamino)ethyl]-methanesulfonanilide. | 2'-hydroxy-5'-[2-(cyclopropylmethylamino)-1-hydroxyethyl]methanesulfonanilide. |
| 26 | 2'-hydroxy-5'-[2(o-methoxyphenylpiperazino)ethyl]methanesulfonanilide. | 2'-hydroxy-5'-[2-(o-methoxyphenylpiperazino)-1-hydroxyethyl]methanesulfonanilide. |
| 27 | 2'-hydroxy-5'-[2-(cyclohex-3-eneamino)ethyl]n-butanesulfonanilide. | 2'-hydroxy-5'-[2-(cyclohex-3-eneamino)-1-hydroxybutyl]methanesulfonanilide. |
| 28 | 2'-hydroxy-5'-[2-(N,N-dimethylamino)butyl]methanesulfonanilide. | 2'-hydroxy-5'-[2-(N,N-dimethylamino)-1-hydroxybutyl]methanesulfonanilide. |
| 29 | 2'-hydroxy-5'-[2-(allylamino)ethyl]methanesulfonanilide. | 2'-hydroxy-5'-[2-(allylamino)-1-hydroxyethyl]methanesulfonanilide. |
| 30 | 2'-hydroxy-5'-[2-(adamantylamino)ethyl]methanesulfonanilide. | 2'-hydroxy-5'-[2-(adamantylamino)-1-hydroxyethyl]methanesulfonanilide. |
| 31 | 3'-hydroxy-5'-[2-(2-aminomethylbicyclo-(2,2,1)-5-heptene)ethyl]methanesulfonanilide. | 3'-hydroxy-5'-[2-(2-aminomethylbicyclo-(2,2,1)-5-heptene)-1-hydroxyethyl]-methanesulfonanilide. |
| 32 | 2'-hydroxy-5'-[2-(1-methoxy-2-propylamino)ethyl]methanesulfonanilide. | 2'-hydroxy-5'-[2-(1-methoxy-2-propylamino)-1-hydroxyethyl]methanesulfonanilide. |
| 33 | 2'-hydroxy-5'-[2-(1-(3-indolyl)-2-propylamino)ethyl]methanesulfonanilide. | 2'-hydroxy-5'-[1-hydroxy-2-[1-(3-indolyl)-2-propylamino]ethyl]methanesulfonanilide. |

TABLE IV

[Various 5'-(2-aminoethyl)-2'-hydroxy-$R^1SO_2$-analides]

| Starting material | Product |
|---|---|
| Hexanesulfonyl chloride | 5'-(2-aminoethyl)-2'-hydroxyhexanesulfonanilide. |
| Benzenesulfonyl chloride | 5'-(2-aminoethyl)-2'-hydroxybenzenesulfonanilide. |
| p-Toluenesulfonyl chloride | 5'-(2-aminoethyl)-2'-hydroxy(4-toluene)sulfonanilide. |
| o-Chlorobenzenesulfonyl | 5'-(2-aminoethyl)-2'-hydroxy(2-chlorobenzene)sulfonanilide. |
| m-Bromobenzenesulfonyl bromide | 5'-(2-aminoethyl)-2'-hydroxy(3-bromobenzene)sulfonanilide. |
| p-Fluorobenzenesulfonyl chloride | 5'-(2-aminoethyl)-2'-hydroxy(4-fluorobenzene)sulfonanilide. |
| p-Methoxybenzenesulfonyl chloride | 5'-(2-aminoethyl)-2'-hydroxy(4-methoxybenzene)sulfonanilide. |
| α-Naphthalenesulfonyl chloride | 5'-(2-aminoethyl)-2'-hydroxy(1-naphthyl)sulfonanilide. |
| 2-methoxynaphthalene-7-sulfonyl chloride. | 5'-(2-aminoethyl)-2'-hydroxy(2-methoxy-7-naphthyl)sulfonanilide. |
| 2,5-dimethylbenzenesulfonyl chloride | 5'-(2-aminoethyl)-2'-hydroxy(2,5-dimethylbenzene)sulfonanilide. |
| 2,5-dichlorobenzenesulfonyl chloride | 5'-(2-aminoethyl)-2'-hydroxy(2,5-dichlorobenzene)sulfonanilide. |

PROCEDURE 17

4-benzyloxy-3-methanesulfonamidobenzaldehyde dimethyl acetal

The preparation described in Procedure 5 is repeated as described, including the step of separating precipitated by-product triethylamine hydrochloride by filtration. The filtrate is then concentrated at reduced pressure until the solvent has been removed yielding an orange oil as residue. This material crystallizes on standing and is purified by trituration with isopropyl alcohol, M.P. 83–87° C.

PROCEDURE 18

5'-formyl-2'-hydroxymethanesulfonanilide

A mixture of 20 g. (0.057 mole) of 4-benzyloxy-3-methanesulfonamidobenzaldehyde dimethyl acetal (Procedure 17), 2.5 g. of 10% palladium-on-carbon, and 200 ml. of ethanol is hydrogenated at 60 p.s.i. until 0.057 mole of hydrogen has been absorbed. The reaction mixture is filtered and the filtrate concentrated under reduced pressure to a residual oil weighing 12.5 g. The oil is dissolved in 25 ml. of warm ethanol, acidified with concentrated hydrochloric acid, diluted with 40 ml. of water, and chilled. The product crystallizes and is collected on a filter, washed with water, and air dried; yield, 5.5 g., M.P. 188–194° C. (dec.). An additional quantity may be isolated by concentrating the filtrate. Recrystallization from dilute ethanol yields purified product; M.P. 195–199.5° C. (dec.).

*Analysis.*—Calcd. for $C_8H_9NO_4S$ (percent): C, 44.64; H, 4.21; S, 14.90. Found (percent): C, 44.80; H, 4.52; S, 14.68.

This material is suitable for transformation into the phenalkylamine products of Formula I according to the methods of Equations 1–9 and Equations 10–11.

While several particular embodiments of this invention are shown above, it will be understood, of course, that the invention is not to be limited thereto, since many modifications may be made, and it is contemplated, therefore, by the appended claims, to cover any such modifications as fall within the spirit and scope of this invention.

What is claimed is:

1. The compound selected from the group consisting of

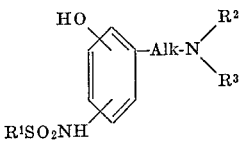

and the pharmaceutically acceptable acid addition and metal salts thereof wherein Alk is an alkylene group of two to five carbon atoms joining the phenyl ring and the nitrogen atom through two or three carbon atoms;

$R^1$ is lower alkyl, phenyl, naphthyl, substituted phenyl, and substituted naphthyl wherein said substituent is halogen, lower alkyl, or lower alkoxy wherein each of said lower alkyl, and lower alkoxy groups have no more than 6 carbon atoms; and,

is a heterocyclic group selected from the group consisting of piperidine, morpholine, piperazine, pyrrolidine, hexamethylene, and thiamorpholine, said group bonded to Alk through the nitrogen atom thereof or amino in which;

$R^2$ is hydrogen, lower alkyl of no more than 4 carbon atoms, benzyl, or benzhydryl; and $R^3$ is 1-(3-indolyl)-2-propyl, methylbicyclo[2.2.1]-5-heptenyl, adamantyl, 1-methoxyisopropyl, hydrogen, alkyl, alkenyl, cycloalkyl, cycloalkenyl, cycloalkylalkyl, each containing no more than 10 carbon atoms, phenyl, phenylalkyl up to 10 carbon atoms, phenoxyalkyl up to 10 carbon atoms, substituted phenylalkyl and phenoxyalkyl wherein said substituent is selected from the group consisting of $R^1SO_2NH$, lower alkyl of no more than 4 carbon atoms and lower alkoxy of more than 4 carbon atoms.

2. 5' - (2-aminoethyl)-2'-hydroxymethanesulfonanilide, referred to in claim 1.

3. 5'-(2 - aminoethyl)-2'-hydroxymethanesulfonanilide hydrochloride, referred to in claim 1.

4. 5'-(2-aminopropyl)-2'-hydroxymethanesulfonanilide, referred to in claim 1.

5. 5'-(2-aminopropyl)-2'-hydroxymethanesulfonanilide hydrochloride, referred to in claim 1.

6. 2'-hydroxy - 5' - [2-(isopropylamino)ethyl]methanesulfonanilide, referred to in claim 1.

7. 2'-hydroxy - 5' - (2-isopropylaminopropyl)methanesulfonanilide, referred to in claim 1.

8. 2'-hydroxy-5'-[2-(phenethylamino)propyl]methanesulfonanilide, referred to in claim 1.

9. 2'-hydroxy - 5' - (2-methylaminoethyl)methane-sulfonanilide, referred to in claim 1.

10. 2' - hydroxy-5'-[2-(1-phenoxy-2-propylamino)ethyl]-methanesulfonanilide, referred to in claim 1.

11. 2' - hydroxy-5'-[2'-(1-phenoxy-2-propylamino)propyl]-methanesulfonanilide, referred to in claim 1.

12. 2'-hydroxy-5'-[2-(4-methoxyphenethylamino)propyl-methanesulfonanilide, referred to in claim 1.

13. 2'-hydroxy-4'-[2 - (isopropylamino)ethyl]methanesulfonanilide, referred to in claim 1.

14. 5'[2-(cyclopropylamino)ethyl]-2'-hydroxymethanesulfonanilide, referred to in claim 1.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 424—250 |
| 3,341,584 | 9/1967 | Larsen et al. | 260—556 |

HENRY R. JILES, Primary Examiner

S. D. WINTERS, Assistant Examiner

U.S. Cl. X.R.

260—293.4, 326.12, 247.1, 268, 326.5, 326.11, 239, 243, 283, 345.9, 600, 613, 575, 519; 424—321, 267, 274, 248, 250, 244 246, 258

UNITED STATES PATENT OFFICE
CERTIFICATE OF CORRECTION

Patent No. 3,574,741　　　　　　　Dated April 13, 1971

Inventor(s) William A. Gould, deceased by Barbara E. Gould and Aubrey A. Larsen

It is certified that error appears in the above-identified patent and that said Letters Patent are hereby corrected as shown below:

Col. 1, ll. 41-44　—　the formula" $-N{<}^{R^3}_{R^3}$ " should be 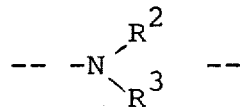

Col. 3, l. 4　—　After "additional" insert -- active --

Col. 3, l. 8　—　"chlorophenpyridamine" should be -- chlorprophenpyridamine --

Col. 3, l. 26　—　"1.1" should be -- l 1. --

Col. 3, l. 37　—　insert parenthesis --( -- before "2" (first occurrence)

Col. 3, l. 59　—　after "5'" insert a hyphen "-" before the parenthesis

Col. 4, l. 16　—　change "-al-k" to -- -alk- --

Continued . .

Page Two

REQUEST FOR CERTIFICATE OF CORRECTION

Patent No.    3,574,741

Dated:    April 13, 1971

Inventor(s):    William A. Gould, deceased, by Barbara E. Gould and Aubrey A. Larsen

---

Col. 5 — In Formula IV, 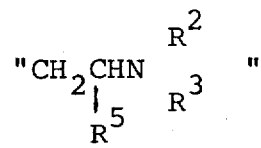

should be 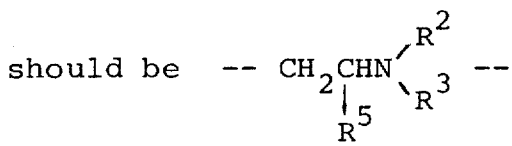

Col. 6, l. 28 — "EQUATIONS 5-9" should be centered above the formulas (rather than below)

Col. 6, l. 15 — In the formula (first occurrence) "$CH(OCH_3)_2$" the numeral "3" is not clear.

Col. 6, After line 25 — Insert -- FORMULA V -- beneath the left-hand column of formulas and insert -- FORMULA III -- beneath the right-hand column of formulas.

Col. 6, l. 73 — "alpha" should be italicized

Col. 7, l. 16 — "140°" should be "144°"

Col. 11, l. 30 — "provies" should be "provides"

Page Three

REQUEST FOR CERTIFICATE OF CORRECTION

Patent No.     3,574,741

Dated:         April 13, 1971

Inventor(s):   William A. Gould, deceased, by Barbara E. Gould and Aubrey A. Larsen

---

Col. 11, l. 45    -    "745" should be "7.45"

Col. 12,          -    In Table II, under Column M.P., for Example Number 2, after "217-219" insert -- (dec.) --

Col. 12,          -    In Table II, under Column M.P. for Example Number 3, after "254.5-258.5" insert -(dec.)-

Col. 12,          -    In Table II, under Column M.P., for Example Number 9, after "258.5-260.5" insert -- (dec.) --

Col. 12,          -    In Table II, under Column M.P. for Example Number 10, after "204.5-205.5" insert -- (dec.) --

Page Four

REQUEST FOR CERTIFICATE OF CORRECTION

Patent No.      3,574,741

Dated:          April 13, 1971

Inventor(s):    William A. Gould, deceased by Barbara E. Gould and Aubrey A. Larsen

---

| | | |
|---|---|---|
| Col. 14, | - | In Table IV, under "STARTING MATERIAL", the 4th one down, after "chlorobenzenesulfonyl" insert -- chloride -- |
| Col. 16, 1. 9 | - | delete ";" |
| Col. 16, 1. 21 | - | after "of" insert -- no -- |
| Col. 16, 1. 36 Claim 9 | - | delete the hyphen "-" in "methane-sulfonanilide" |
| Col. 16, 1. 44 | - | after "yl" delete the dash "-" and insert "]" |
| Col. 16, 1. 47 | - | after "5'" insert a dash -- - -- |

Signed and sealed this 5th day of December 1972.

(SEAL)
Attest:

EDWARD M. FLETCHER, JR.
Attesting Officer

ROBERT GOTTSCHALK
Commissioner of Pate